United States Patent [19]
Ellison et al.

[11] Patent Number: 5,514,427
[45] Date of Patent: May 7, 1996

[54] INJECTION MOLDED PLASTIC ARTICLE WITH INTEGRAL WEATHERABLE PIGMENTED FILM SURFACE

[75] Inventors: Thomas M. Ellison, Charlotte; Brian M. Keith, Waxhaw, both of N.C.

[73] Assignee: Rexam Industries Corp., Charlotte, N.C.

[21] Appl. No.: 267,568

[22] Filed: Jun. 28, 1994

Related U.S. Application Data

[62] Division of Ser. No. 955,317, Oct. 1, 1992, Pat. No. 5,342,666, which is a continuation of Ser. No. 410,662, Sep. 21, 1989, abandoned, which is a continuation-in-part of Ser. No. 924,295, Oct. 28, 1986, abandoned.

[51] Int. Cl.$^6$ ....................................... B60R 13/00
[52] U.S. Cl. ........................... 428/31; 428/421; 428/515; 428/520; 428/908.8
[58] Field of Search ................................ 428/31, 46, 187, 428/421, 422, 515, 520, 908.8

[56] References Cited

U.S. PATENT DOCUMENTS

| | | | |
|---|---|---|---|
| 3,122,598 | 2/1964 | Berger | 264/247 |
| 3,257,266 | 6/1966 | Sapper | 428/421 |
| 3,338,617 | 8/1967 | Lockwood | 428/31 X |
| 3,459,834 | 8/1969 | Schmitt | 525/199 |
| 3,524,906 | 8/1970 | Schmitt et al. | 428/142 X |
| 3,551,232 | 12/1970 | Thompson | 428/327 X |
| 3,579,485 | 5/1971 | Folzenlogen et al. | 525/285 |
| 3,616,192 | 10/1971 | Sinclair | 428/13 |
| 3,654,062 | 4/1972 | Loew | 428/16 X |
| 3,655,840 | 4/1972 | Krug | 264/46.8 |

(List continued on next page.)

FOREIGN PATENT DOCUMENTS

| | | |
|---|---|---|
| 929984 | 7/1973 | Canada . |
| 230364 | 7/1987 | European Pat. Off. . |
| 251546 | 1/1988 | European Pat. Off. . |
| 285071 | 10/1988 | European Pat. Off. . |
| 374551 | 6/1990 | European Pat. Off. . |
| 2085615 | 12/1971 | France . |
| 3441906 | 5/1986 | Germany . |
| 56140064 | 3/1983 | Japan . |
| 59-135231 | 8/1984 | Japan . |
| 59-227447 | 12/1984 | Japan . |
| 1232971 | 5/1971 | United Kingdom . |
| 2079182 | 1/1982 | United Kingdom . |
| 2084513 | 4/1982 | United Kingdom . |
| WO88/07416 | 10/1988 | WIPO . |
| WO89/04350 | 5/1989 | WIPO . |
| WO89/04257 | 5/1989 | WIPO . |
| WO89/04218 | 5/1989 | WIPO . |

OTHER PUBLICATIONS

*Modern Plastics*, Oct. 1984, pp. 22–24.
J. P. McCarthy, "Polypropylene", *Modern Plastics Encyclopedia*, 1984–1985, p. 80.
T. M. Ellison et al., "In-Mold Decorating and Finishing Plastic Parts with Dry Paint Film", In Tune with the Newest Decorating Technologies, Retac Proceedings, Oct. 1993, pp. 13–21.
Rexham Decorative Products Brochure, Brilliant Performance, "The Fluorex™ film finish by Rexham. Tough enough to outweather paint and PVC on exterior automobile parts", 1987.

(List continued on next page.)

*Primary Examiner*—Henry F. Epstein
*Attorney, Agent, or Firm*—Bell, Seltzer, Park & Gibson

[57] ABSTRACT

Molded articles having contoured, decorative outer surfaces are disclosed. The articles comprise a molded polymer substrate and a decorative surfacing film adhered to one side of the substrate. The decorative surfacing film comprises a substantially molecularly unoriented cast polymer film formed from a weatherable polymer. The articles are particularly suited for use as automobile body panels and the like. Also disclosed is a method for making such articles, and a method for making sets of such articles for assembly into automobile bodies and the like.

22 Claims, 2 Drawing Sheets

U.S. PATENT DOCUMENTS

| | | | |
|---|---|---|---|
| 3,679,506 | 7/1972 | Burgess et al. | 156/209 |
| 3,679,510 | 7/1972 | Conley et al. | 428/420 X |
| 3,880,690 | 4/1975 | Fuchs et al. | 428/421 X |
| 3,914,482 | 10/1975 | Sana et al. | 428/31 |
| 3,949,139 | 4/1976 | Dunning et al. | 428/328 |
| 4,086,118 | 4/1978 | Dewey | 428/327 |
| 4,141,927 | 2/1979 | White et al. | 525/432 |
| 4,201,820 | 5/1980 | Johnson | 428/195 |
| 4,211,590 | 7/1980 | Steward et al. | 428/319.7 X |
| 4,263,077 | 4/1981 | Rampelberg | 428/151 X |
| 4,303,697 | 12/1981 | Baseden | 428/520 X |
| 4,314,004 | 2/1982 | Stoneberg | 428/421 |
| 4,317,860 | 3/1982 | Strassel | 428/421 |
| 4,349,592 | 9/1982 | Nussbaum | 428/31 |
| 4,364,886 | 12/1982 | Strassel | 264/171 |
| 4,368,224 | 1/1983 | Jackson | 428/31 |
| 4,369,157 | 1/1983 | Conner | 264/266 X |
| 4,396,672 | 8/1983 | Adesko | 428/31 X |
| 4,396,680 | 8/1983 | Chang | 428/31 X |
| 4,403,003 | 9/1983 | Beckhouse | 428/31 X |
| 4,415,519 | 11/1983 | Strassel | 264/171 |
| 4,446,179 | 5/1984 | Waugh | 428/31 |
| 4,451,522 | 5/1984 | de Vroom | 428/201 |
| 4,451,597 | 5/1984 | Victorius | 428/31 X |
| 4,482,586 | 11/1984 | Smith et al. | 428/480 X |
| 4,486,478 | 12/1984 | Madonia et al. | 428/31 |
| 4,507,342 | 3/1985 | Kielbania, Jr. | 428/90 |
| 4,515,649 | 5/1985 | Nussbaum et al. | 428/31 X |
| 4,548,857 | 10/1985 | Galante | 428/200 |
| 4,560,956 | 12/1985 | Coscin | 331/158 X |
| 4,574,103 | 3/1986 | Stamper | 428/213 |
| 4,623,413 | 11/1986 | Questel et al. | 156/247 |
| 4,652,470 | 3/1987 | Das et al. | 427/407.1 |
| 4,654,239 | 3/1987 | Sancovsky | 428/31 |
| 4,656,098 | 4/1987 | Yonekura et al. | 428/31 X |
| 4,678,690 | 7/1987 | Palmer et al. | 428/31 |
| 4,681,811 | 7/1987 | Simpson et al. | 428/413 |
| 4,699,814 | 10/1987 | Ambrose et al. | 427/407.1 |
| 4,719,132 | 1/1988 | Porter | 428/423.1 X |
| 4,734,312 | 3/1988 | Sugiyama | 428/157 |
| 4,769,100 | 9/1988 | Short et al. | 428/31 X |
| 4,810,540 | 3/1989 | Ellison et al. | 428/31 |
| 4,818,589 | 4/1989 | Johnson et al. | 428/201 |
| 4,824,506 | 4/1989 | Hoerner et al. | 156/245 |
| 4,828,637 | 5/1989 | Mentzer et al. | 428/31 X |
| 4,832,991 | 5/1989 | Hayward et al. | 427/407.1 X |
| 4,872,270 | 10/1989 | Fronheiser et al. | 427/372.2 X |
| 4,902,557 | 2/1990 | Rohrbacher | 428/31 X |
| 4,913,760 | 4/1990 | Benson et al. | 427/407.1 X |
| 4,913,970 | 4/1990 | Hayward et al. | 428/31 X |
| 4,918,800 | 4/1990 | Reafler et al. | 428/31 X |
| 4,931,324 | 6/1990 | Ellison et al. | 428/31 |
| 4,959,189 | 9/1990 | Rohrbacher et al. | 428/31 X |
| 5,009,821 | 4/1991 | Weaver | 264/22 |
| 5,026,448 | 6/1991 | Reafler et al. | 428/31 X |
| 5,030,514 | 7/1991 | Hartman | 428/423.1 |
| 5,055,346 | 10/1991 | Rohrbacher | 428/31 X |
| 5,215,826 | 6/1993 | Shimanski et al. | 428/31 X |
| 5,342,666 | 8/1994 | Ellison et al. | 428/31 X |

OTHER PUBLICATIONS

Eastman Chemicals Publication, "Chlorinated Polyolefin CP 343–1(100%)", Publication No. GN–355, Nov. 1983.

"Fluoropolymer Gives Ford Flair", *British Plastics and Rubber*, Oct. 1983.

*Japan Economic Journal*, Oct. 18, 1986, p. 1, "Auto parts makers to move production to N. America".

*Machine Design*, Oct. 25, 1984, vol. 56, pp. 56, ISSN: 0024–9114, "Automakers continue to say yes to plastics".

*Automotive Industries*, Sep., 1984, vol. 164, p. 72, ISSN: 0273–656X, "Future looks bright for European plastics".

*Ward's Auto World*, Sep. 1983, vol. 19, p. 31, ISSN: 0043–0315, "Honda's CRX sports plastics innovation".

Dialog Trademarkscan database printout for the trademark FLUOREX, U.S. Registration No. 1,554,682 registration date Sep. 5, 1989.

"A Method for Obtaining Prepainted Parts Using a Painted Carrier Film", Research Disclosure Jul. 1984, p. 304 (disclosed anonymously).

Ricklin, S., "Solvent–Cast Films", *Plastics Engineering*, May 1983, pp. 29–33.

*Plastics Engineering*, May 1983, p. 29, Solvent–cast Films, Saul Ricklin, Consultant.

*Chemical Week*, Jul. 4, 1984, p. 30, Automotive Coatings: Helping Detroit Woo Consumers.

B. Johnson, *Development of an Automotive "Paint Film" Concept*, SAE Technical Paper Series, International Congress and Exposition, Detroit, Michigan, Feb. 27–Mar. 3, 1989.

Research Disclosure, Jul. 1984, No. 243, Disclosure 24303, "A Method for Obtaining Prepainted Parts Using a Painted Carrier Film", Publisher: Kenneth Mason Publications, Ltd.

Affidavits of Victor H. Rampelberg and Dennis Northrop and accompanying exhibits.

INJECTION MOLDED PLASTIC ARTICLE WITH INTEGRAL WEATHERABLE PIGMENTED FILM SURFACE

CROSS REFERENCE TO RELATED APPLICATION

This application is a division of application Ser. No. 07/955,317, now U.S. Pat. No. 5,342,666 filed Oct. 1, 1992, which is a continuation of application Ser. No. 07/410,662, filed on Sep. 21, 1989, now abandoned, which in turn is a continuation-in-part of copending application Ser. No. 06/924,295 filed Oct. 28, 1986 and now abandoned.

FIELD OF THE INVENTION

This invention relates to shaped molded polymer articles generally, and particularly relates to shaped articles formed from a molded polymer substrate which have a decorative surfacing film on the outer surface thereof presenting a surface appearance of high quality comparable to a high quality automotive paint finish.

BACKGROUND OF THE INVENTION

The trend in the automobile industry is towards increased use of plastic body panels in automobile construction. Use of such panels makes it possible to reduce the weight of the automobiles and also to reduce tooling costs arising from body styling changes, while providing increased styling freedom in car design. Other advantages arising from this type of construction include reduced facility costs and factory floor space requirements, and process cycle times allowing the just-in-time, low inventory manufacturing of parts at or near the automobile assembly plant. See C. Kirkland and P. Dickard, Dateline: Detroit. SAE Show News Bulletins, *Plastic Technology*, page 103 (April 1986).

A significant problem with plastic automobile body parts is that many of the most desirable molding polymers for such parts are not weatherable. Moreover, many such polymers do not provide a good bonding surface for paints. Even where paint bonding problems are overcome, conventional spray-painting techniques pose a significant pollution problem arising from the evaporation of noxious paint solvents, and, further, are very expensive if a high quality, multiple coat paint finish is to be obtained. Because the overall finished appearance of an automobile is among its most important selling features, these problems are serious, and a great deal of effort and expense is being devoted to their solution. See, for example, *Automotive Coatings: Helping Detroit Woo Consumers*, Chemical Week, page 30, (Jul. 4, 1984). One approach to this problem is to provide a film surface for the plastic part.

Various molded polymer automobile parts with film surfaces have been made in the past. For example, clear, unpigmented, nonweatherable, cast PVC films have been used to surface interior automobile parts. Another example, U.S. Pat. No. 3,679,510 to Conley and Ellison, discloses a reverse-printed, oriented, polyvinyl fluoride film (a "TEDLAR" film) bonded to a molded polymer substrate. Such weatherable, oriented films are excellent for use in making side rails and other automobile trim parts. These films are, however, difficult to uniformly internally pigment, and are generally not suitable for use in a deep draw molding procedure. In order to be useful as a surfacing film on exterior automobile parts, the film must duplicate the surface appearance of a quality automobile paint finish. The finish must have high gloss, high distinctness of image (DOI), excellent weatherability and durability under exposure to sunlight and temperature extremes, and the film must match the solid and metallic colors used in automobile paint finishes.

Accordingly, an object of the present invention is to provide a molded polymer article which has a weatherable surface.

A further object of the invention is to provide an article as described above which has a high grade decorative finish suitable for use as an automobile body part.

An additional object of the invention is to provide an article of the type described which can be deep draw molded into various three-dimensional shapes used in automobile body parts.

SUMMARY OF THE INVENTION

These and other objects and advantages of the present invention are achieved in the embodiments illustrated herein by the provision of an article having a contoured, decorative outer surface, and which is comprised of a molded polymer substrate and a decorative surfacing film adhered to one side of the substrate and conforming to the contoured surface. The decorative surfacing film comprises a substantially molecularly unoriented cast polymer film formed from a weatherable polymer, which film has pigments, such as colored pigments or reflective flakes, uniformly distributed therein.

Use of a cast polymer film is important in obtaining uniform distribution of the pigments within the film and enables the production of a high-quality decorative surfacing film with an appearance which closely simulates the high grade automotive paint finishes used on automobile body parts. Such pigmented, cast, weatherable films are suitable for deep draw molding, as will be explained below, and do not require the use of separate pigment layers in addition to a protective weatherable outer layer.

A shaped article as described above is made by placing into a mold having a contoured, three-dimensional molding surface, a preformed decorative surfacing film of the type described above. A moldable polymer is then introduced into the mold on one side of the surfacing film. The surfacing film is then molded into a contoured three-dimensional configuration conforming to the molding surface of said mold, while molding said polymer to form a shaped article with the decorative surfacing film adhered to the outer surface thereof.

The decorative surfacing film also includes a bonding layer formed of a thermoplastic thermoformable polymer, different from the cast film. The decorative surfacing film is placed into the mold with the bonding layer oriented inwardly away from the molding surface so as to become adhered to the moldable polymer.

Also disclosed herein is a method of making a structure such as an automobile body which has a uniform decorative outer surface, which is comprised of a set of interconnected shaped articles, each article being formed from a molded polymer material (and optionally from a plurality of different moldable polymer materials), and each article having a decorative surfacing film on the outer surface thereof presenting a surface appearance of high quality comparable to a high quality automobile paint finish. Each article in the set is preferably formed of a moldable polymer which is selected to provide the desired structural properties to the particular location in the assembled structure in which it is installed. At the same time, while the assembled structure

DETAILED DESCRIPTION OF THE INVENTION

Figure 1:
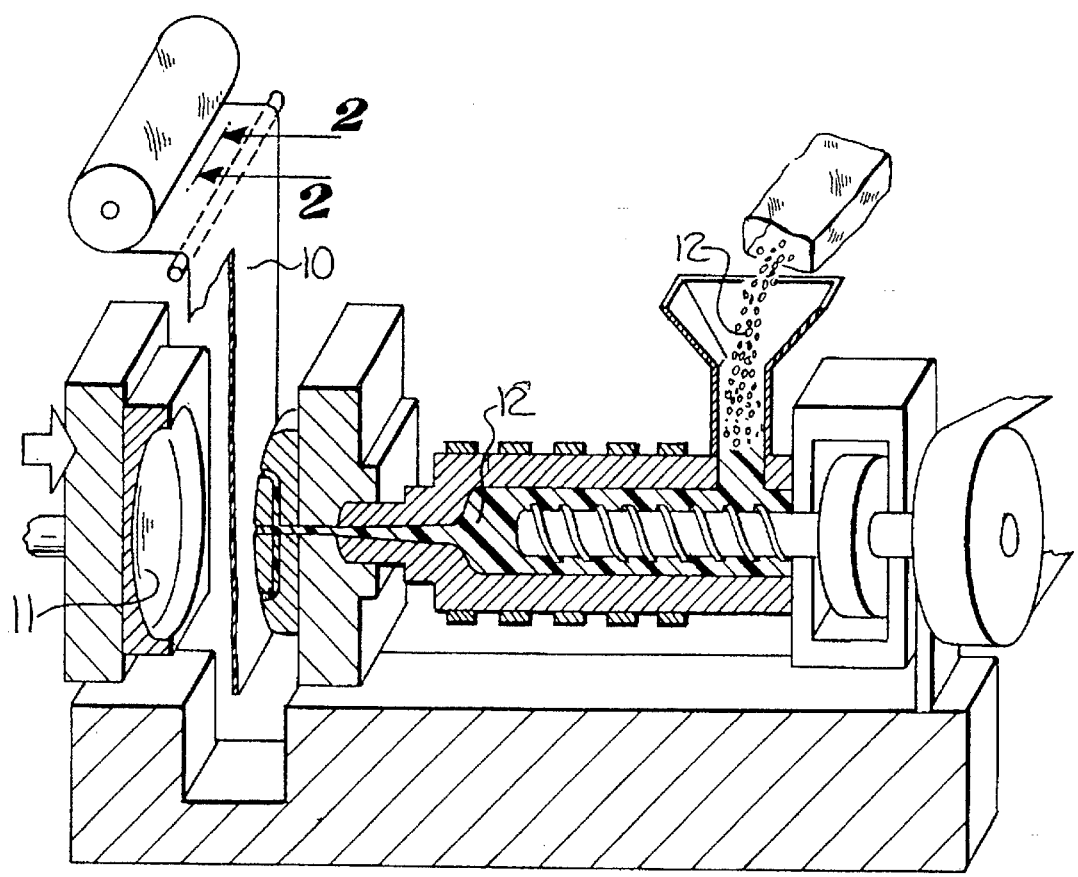
FIG. 1 is a schematic illustration of an apparatus and procedure for making molded plastic articles of the present invention.
Figure 2:
FIG. 2 is a cross-section of a decorative film, taken along the line 2—2 of FIG. 1.

Molded plastic articles of the present invention can be made by placing a preformed decorative surfacing film 10 into a mold 11, closing the mold, and injecting a moldable polymer 12 into the mold on the inner side of the film 10 (see FIG. 1). The decorative surfacing film, as shown in FIG. 2, comprises a substantially molecularly unoriented weatherable cast film 13 which has pigments uniformly distributed therein, and a bonding layer 14 formed of a different polymer adhered to the inner side of the cast film.

Figure 3:
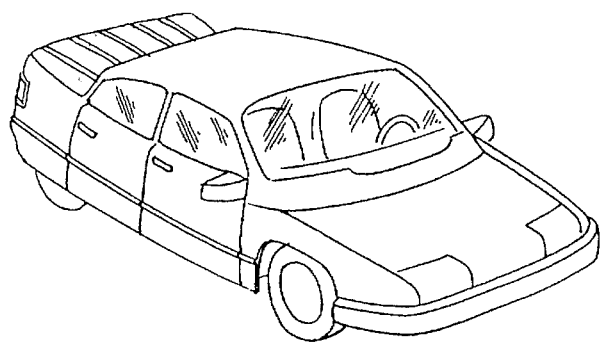
FIG. 3 is a perspective view of an automobile formed from a set of molded plastic articles of the present invention.
Figure 4:
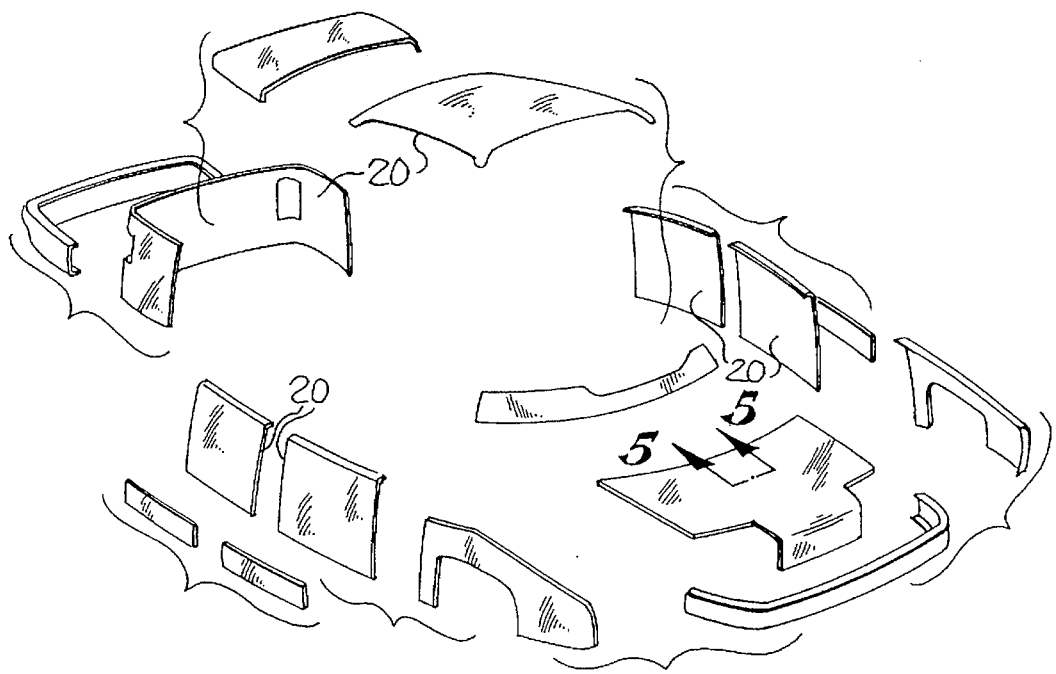
FIG. 4 is an exploded view of a set of molded plastic articles of the present invention.
Figure 5:
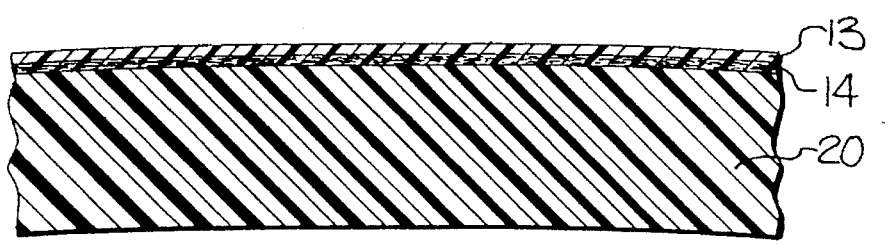
FIG. 5 is a cross-section of a molded plastic article taken along the line 5—5 of FIG. 4.

Molded plastic articles 20 of the present invention are useful in a variety of applications where it is desired to have a high quality paint-like appearance on a molded plastic article. Such articles are particularly suitable for use in exterior applications such as exterior building panels or as outer body panels in an automobile, as illustrated in FIG. 3. Such an automobile has a body which is comprised of a set of molded plastic articles 20, as illustrated in FIG. 4. FIG. 5 illustrates a cross section of a molded plastic article of the present invention, with the preformed decorative surfacing film 10 adhered to the molded polymer substrate 21. FIG. 5 shows that the bonding layer 14 is adhered to the molded polymer substrate 21, with the weatherable cast film on the outer surface of the article.

Cast films for practicing the present invention should be selected so they are pigmentable, thermoformable and weatherable. Such films are substantially molecularly unoriented cast films, as opposed to films which have been oriented or biaxially oriented. The films are "preformed" films, in that they are provided as self-supporting sheets of material. Such films are prepared by a number of known liquid casting methods, such as by spreading a solvent solution having a polymer dissolved therein onto a carrier with a casting die, doctor bar, or reverse roll coater, then evaporating the solvent, and then stripping the polymer film from the carrier. The reverse-roll coating method is the preferred method of making liquid cast films for the present invention. Other liquid casting methods are also known and useful for practicing the present invention. In appropriate cases, a plastisol, organosol, or dispersion of the polymer can be cast onto the carrier instead of a solvent solution. For example, polytetrafluoroethylene, which is virtually insoluble, can be cast as a dispersion. Such liquid cast film processes, and some current uses of cast films, are discussed in *Plastics Engineering*, at pages 29–33 (May, 1983). Thus, for purposes of the present invention, "substantially molecularly unoriented cast films" are liquid cast films, and not melt cast films or films formed by melt extrusion.

Colored pigments are uniformly distributed in the cast film by dispersing them in a vehicle compatible with the liquid from which the film is cast, and mixing the vehicle with the same prior to casting the film. When a metallic paint finish is desired, reflective flake pigments, such as aluminum flakes of the type used to produce metallic finishes on automobiles, or mica flakes, either surface treated (e.g., pigmented) or not, of the type used in automobile finishes, are uniformly distributed in the cast film in like manner. U.V. screeners are added as needed to improve the weatherability of the cast films. For certain automotive styling effects, the cast film 13 may be formed of multiple layers of liquid cast molecularly unoriented polymer. For example, the glossy wet look of a base coat/clear coat automotive finish is achieved by a combination of layers, with the outer or top layer being a transparent layer of high gloss and optical clarity, and with an underlying opaque layer containing colored and/or metallic pigments providing the desired color.

Polymers suitable for forming such weatherable cast films are selected to provide a pigmented film which will not significantly fade, peel, chalk, or crack, when exposed to the environment, for the intended life of the product for which the molded plastic article is made. A number of known testing procedures, in which objects are exposed to either the natural environment over an extended time or a harsh artificial environment for a short time, are used to determine the weatherability of polymers. Such weatherable polymers include fluoropolymers, acrylate polymers, urethane polymers, and blends thereof. Acrylate polymers useful for practicing the present invention are obtained from a variety of acrylic monomers, such as acrylic and methacrylic acids, and their amides, esters, salts, and corresponding nitriles. Particularly suitable monomers for such polymers are methyl methacrylate, ethyl acrylate, and acrylonitrile. The polymers may each be used in the form of homopolymers, or with various other monomers which can be copolymerized therewith. Additional illustrative examples of acrylate polymers which may be useful for the present invention are thermoplastic polyacrylates and polymethacrylates which are homopolymers and copolymers of acrylic acid ester and methacrylic acid ester, such as, for example, polyacrylic acid isobutyl ester, polymethacrylic acid methyl ester, polymethacrylic acid ethylhexyl ester, polyacrylic acid ethyl ester; copolymers of various acrylic acid esters and/or methacrylic acid esters, such as, for example, methacrylic acid methyl ester/acrylic acid cyclohexyl ester copolymers; and copolymers of acrylic acid esters and/or methacrylic acid esters with styrene and/or alpha-methylstyrene, as well as the graft polymers and copolymers and polymer mixtures composed of acrylic esters, methacrylic acid esters, styrene and butadiene. A group of transparent, weatherable blends of acrylate polymers and polyvinylidene fluoride polymers useful for practicing the present invention are disclosed in U.S. Pat. No. 3,524,906. The disclosures of this patent, and all other patent references cited herein, are specifically intended to be incorporated herein by reference.

Fluoropolymers useful for practicing the present invention include polymers and copolymers formed from trifluoroethylene, tetrafluoroethylene, hexafluoropropylene, monochlorotrifluoroethylene and dichlorodifluoroethylene. Copolymers and terpolymers of these monomers formed from fluoroolefins such as vinylidene fluoride are also useful. Further illustrative examples of fluoropolymers useful for practicing the present invention include polyvinyl fluoride, polyvinylidene fluoride, fluorinated ethylene/propylene copolymers ("FEP" resins), ethylene/chlorotrifluoroethylene copolymers, vinylidene fluoride/hexafluoropropene copolymers, and vinylidene fluoride/perfluoro (alkyl vinyl ether) dipolymers and terpolymers with tetrafluoroethylene. Illustrative of the commercially available fluoropolymer resins useful for practicing the present invention are those sold under such trademarks as KYNAR, FORAFLON, SOLEF, LUMIFLON, and TEFLON. These resins can be formulated and formed by liquid casting into films. An illustrative weatherable polymer film for use in the present invention is an alloy of an acrylic polymer and polyvinylidene fluoride, such as "FLUOREX®" (a trademark of Rexham Corporation).

Urethane polymers useful for practicing the present invention are prepared by reacting a polyisocyanate with a compound containing at least two active hydrogen atoms, such as a polyol, a polyamine, or a polyisocyanate. Polyurethane resins for use in the present invention should be selected from resins in which the reactants have been chosen to provide weatherable, thermoformable polymers. Numerous suitable polyurethane resins useful for practicing the present invention are available. Generally, aromatic polyisocyanates tend to yellow, and aliphatic polyisocyanates are more preferred. Particularly noteworthy recent developments in this area are disclosed in U.S. Pat. No. 4,578,426 (disclosing resins which give coatings resistant to gasoline and having high flexibility, scratch resistance and weather resistance) and U.S. Pat. No. 4,501,852 (disclosing chemical resistant, abrasion resistant, elastic and durable polyurethanes).

The molded polymer substrate should be selected to provide engineering properties (rigidity, etc.) suited to the specific end use of the particular article made. Such polymers are well known. Suitable polymers for the molded polymer substrate include, for example, polyvinyl chloride, polycarbonate, polystyrene, acrylonitrile-butadiene-styrene, polyethylene, polypropylene, polyethylene terephthalate-glycol, nylon, and RIM urethanes. Polyolefin homopolymers and copolymers (ionomers, etc.) are inexpensive thermoplastic resins which have excellent molding properties and are particularly preferred for practicing the present invention. Polypropylene, for example, when glass filled and foamed with a blowing agent, has performance properties suitable for structural or engineering uses. Acid copolymers of polyethylene such as "SURLYN" (a trademark of E. I. DuPont De Nemours) are similar in performance and in addition have exceptional toughness.

The bonding layer 14 of the decorative surfacing film 10 comprises a thermoplastic polymer layer applied to the inner surface of the cast polymer film 13. In a preferred embodiment, the bonding layer 14 comprises a preformed film of a thermoplastic polymer laminated to the inner surface of the cast film. Bonding of the decorative surfacing film 10 to a polyolefin molded polymer substrate can be achieved with an intermediate bonding layer or layers in accordance with known laminating procedures, and with known adhesives. For example, a decorative surfacing film formed of a cast polymer film layer which is bonded to or coated with a fusible olefin bonding layer can be placed in a mold during injection of an olefin resin. Another approach is to bond a PVC film to a cast weatherable fluoropolymer film with an acrylic adhesive and, in turn, bond the PVC film to an olefin film with a polyester isocyanate adhesive. The cast polymer film may also be laminated to an olefin film with a permanent type acrylic pressure-sensitive adhesive.

In addition to facilitating the bonding of the weatherable cast film to the molded polymer substrate, the bonding layer 14 serves several additional important functions. Since the weatherable cast film has relatively little inherent tensile strength, the bonding layer serves as a reinforcement to facilitate handling of the decorative surfacing film, placement of the film into the mold, and also ensures that it remains wrinkle free in the mold during the molding operation. During molding, as molten plastic is injected into the mold cavity and flows to fill the cavity, the bonding layer acts as a protective stabilizing layer and as an insulator to maintain the high quality outer surface appearance of the surfacing film and prevent the injected molten plastic from causing heat distortion or flow lines which would be visible on the outer surface of the molded article. Thus, the decorative surfacing film retains the gloss and distinctness of image properties which are characteristic of a high quality paint finish, such as the type of paint finish used on an automobile. For shallow contoured parts, the surfacing film may be fed directly from the source roll into the mold cavity. In producing deep-drawn, highly contoured plastic articles, it is desirable to preform the decorative surfacing film, such as by vacuum forming, prior to placement in the mold. The thermoformability properties of the thermoplastic bonding layer make it possible for the surfacing film to be vacuum thermoformed into a desired tree-dimensional configuration, and insures that the thus pre-formed surfacing film retains its pre-formed shape during subsequent handling and placement in the mold of the injection molding machine.

The bonding layer 14 may be from about 0.25 to about 250 thousandths of an inch thick, and most desirably a minimum thickness of 2 mils to ensure good thermoformability and other properties as noted above.

Preferably, the tear strength of the cast film is less than the bond strength of the cast film to the molded polymer substrate. This will prevent tears from forming in the cast film, running across the surface of the molded article, and quickly destroying the article. Instead, the weatherable cast polymer film surface will flake off in small particles when disrupted by nicks and scratches from stones and other flying particles, as routinely confronts automobile surfaces.

The cast weatherable film is preferably between 0.5 and 300 thousandths of an inch thick, and most preferably from about one to about two thousandths of an inch thick. Similar molded parts can be achieved with injected ABS and styrene by laminating the surface film to a corresponding substrate layer of ABS or styrene.

The present invention is carried out on conventional molding equipment in accordance with known techniques. Particularly suitable injection-molding equipment and techniques are disclosed in U.S. Pat. Nos. 4,397,806 and 4,307,057 to Hettinga. The decorative film may be heated and vacuum formed in a separate forming mold prior to being placed in the injection mold, or may be shaped by heat and pressure in the injection mold.

The present invention is particularly suitable for making deep draw molded articles. Deep draw articles, and deep draw molding procedures, are those in which the depth of the molded article is relatively large in relation to the length and width of the two-dimensional decorative surfacing film from which the article is made. More particularly, the depth of the article should be such that substantial stretching and elongation of the decorative surfacing film occurs at least in regions of the decorative surfacing film. Such substantial stretching and elongation occur when the decorative surfacing film is subjected to elongation of about 25% or more at least in regions thereof. The cast film is preferably formed from a polymer selected so that the decorative surfacing film will maintain a paint-like appearance, and will not stress whiten, when stretched and elongated.

With the surfacing film of the present invention, it is possible to produce a structure formed from a set of assembled parts, wherein each part has a uniform decorative outer surface formed by a decorative surfacing film. For example, a set of molded plastic automobile parts can be produced and assembled as shown in FIGS. 3 and 4. This method comprises the steps of first placing into a mold a preformed decorative surfacing film of the type described above, then introducing a moldable polymer into the mold as described above, and then molding the surfacing film and the polymer, as also described above. These three steps (placing the surfacing film into the mold; introducing polymer into the mold; molding the surfacing film and the polymer) are then repeated for each article in the set, so that each article in the set has the same weatherable cast pigmented polymer film on the outer surface thereof. As stated above, the articles in the set may or may not all be formed of the same moldable material. Therefore, for the making of each article, the decorative surfacing film has a bonding layer of a material which has been preselected to adhere to the particular moldable polymer from which that particular article is made. While molding polymers may thus advantageously differ from article to article, and bonding layers may accordingly differ from article to article, every article in the set has the same cast pigmented film on the outer surface thereof. As a result, when the set of molded articles is assembled into the aforesaid structure, the need for spray-painting the structure to otherwise provide it with a uniform decorative outer surface is eliminated.

The present invention is explained further in the following nonlimiting examples.

EXAMPLE 1

A weatherable cast film formed from an alloy of an acrylic polymer and polyvinylidene fluoride (e.g., "FLUOREX"), is formed with internal pigments, including reflective metallic flakes. The film is laminated to a polyvinylchloride (PVC) film with an acrylic adhesive. The multilayered film is then placed in a mold, the mold closed, and PVC injected into the mold behind the polyvinylchloride bonding layer. The PVC molding polymer and the weatherable film/PVC film laminate are then molded for a time and temperature sufficient to form a shaped article, with the weatherable film bonded to the outer surface thereof by the PVC bonding layer.

EXAMPLE 2

The procedure of Example 1 is repeated with polyethylene terephthalate-glycol (PETG) as the bonding substrate and with PETG as the molding polymer to form additional molded articles.

EXAMPLE 3

The same procedure is carried out as described in Example 1 above, except that the cast film is bonded to a PETG bonding film, and RIM urethane is used as the molding resin.

EXAMPLE 4

The same procedure is carried out as described in Example 1 above, except that the cast film is bonded to an acrylonitrile butadiene styrene (ABS) bonding film, and ABS is used as the injection-molding polymer.

EXAMPLE 5

A weatherable cast film formed from an alloy of an acrylic polymer and polyvinylidene fluoride is bonded to a PVC film with an acrylic adhesive, and the PVC film is bonded to a polypropylene film bonding layer with a polyester isocyanate adhesive. An article is made according to the procedures set forth in Example 1, with polypropylene as the molding polymer. Other articles can be made with other olefins as bonding layers, and with thermoplastic olefins, known as "TPO polymers," as molding polymers.

EXAMPLE 6

A weatherable cast film formed from a fluoropolymer, an acrylate polymer, a urethane polymer, or a blend thereof, is bonded, with an acrylate adhesive, to an ABS, PVC, or nylon film to form a decorative surfacing film. Articles are made with such decorative surfacing films according to the procedures set forth in Example 1, with nylon molding polymers.

In the drawings and specification, there has been disclosed typical preferred embodiments of the invention. Although specific terms are employed, they are used in a generic and descriptive sense only and not for purposes of limitation, the scope of the invention being set forth in the following claims.

What is claimed is:

1. A structure comprising a set of molded articles, each of said molded articles of said set comprising a molded polymer substrate having a contoured three-dimensional surface and a preformed decorative surfacing film adhered to and conforming to said contoured three-dimensional surface, said decorative surfacing film comprising a preformed molecularly unoriented liquid-cast weatherable polymer film and a bonding layer formed from a preselected polymer different from said cast polymer film, said bonding layer being adhered to the inner surface of said cast polymer film and adhered to said contoured three-dimensional surface of said substrate, said cast polymer film having pigments therein providing a uniform layer of color to the outer surface of said article, wherein said cast film is the same for every article in said set, and wherein said bonding layer in each of said articles is formed of a polymer preselected to adhere to said moldable polymer of each of said articles, so that said articles have uniformly colored decorative outer surfaces and the need for painting said structure is eliminated.

2. A structure as claimed in claim 1 wherein the articles of said set are all formed from the same moldable material.

3. A structure as claimed in claim 1, wherein the articles of said set are not all formed from the same moldable material.

4. A molded automobile exterior body part having a contoured decorative outer surface, comprising a molded polymer substrate and a molded decorative sheet material adhered to and covering one side of said substrate and conforming to said contoured surface and imparting to said body part a high grade decorative finish having the appearance of an automotive quality painted finish, said decorative sheet material comprising a substantially molecularly unoriented cast weatherable polymer film comprising an alloy of polyvinylidene fluoride and an acrylic polymer, said cast polymer film having pigments therein, and a thermoformable bonding layer adhered to the inner surface of said cast polymer film, said bonding layer comprising a thermoformable layer of a polymer different from said cast polymer film, and an adhesive layer between said thermoformable layer and said cast polymer film adhering said thermoformable layer to said cast polymer film, and said bonding layer also being adhered to said contoured three-dimensional outer surface of said substrate.

5. A body part as claimed in claim 4, wherein said molecularly unoriented cast polymer film has reflective pigments therein.

6. A body part as claimed in claim 4, wherein said bonding layer is formed of an acrylonitrile-butadiene-styrene polymer.

7. A body part as claimed in claim 6, wherein said molded polymer substrate is an acrylonitrile-butadiene-styrene polymer.

8. A body part as claimed in claim 4, wherein said bonding layer is formed of a polyolefin.

9. A body part as claimed in claim 8, wherein said bonding layer is formed of chlorinated polyolefin.

10. A body part as claimed in claim 9, wherein said molded polymer substrate is a polyolefin.

11. A body part as claimed in claim 4, wherein said adhesive comprises an acrylate adhesive.

12. A body part as claimed in claim 4, wherein said decorative sheet material has regions thereof which have been subjected to an elongation of about 25% or more.

13. A body part as claimed in claim 4, wherein said molecularly unoriented cast weatherable polymer film comprises an outer transparent layer of high gloss and an underlying opaque layer containing said pigments.

14. A structure comprising a plurality of the automobile exterior body parts of claim 4, wherein the molded polymer substrate of at least one of said plurality of body parts is formed of a different polymer composition from the molded polymer substrate of another one of said body parts.

15. A structure as claimed in claim 14, wherein the molded polymer substrate of one of said body parts is formed of a thermoplastic olefin polymer and the molded polymer substrate of another one of said body parts is made of acrylonitrile-butadiene-styrene polymer.

16. A structure as claimed in claim 14, wherein the bonding layer of at least one of said plurality of body parts is formed of a different polymer composition from the bonding layer of another one of said body parts.

17. A molded automobile exterior body part having a contoured decorative outer surface, comprising a molded polymer substrate formed of acrylonitrile-butadiene-styrene polymer having a contoured three-dimensional outer surface and a molded decorative sheet material adhered to and covering one side of said substrate and conforming to said contoured surface and imparting to said body part a high grade decorative finish having the appearance of an automotive quality painted finish, said decorative sheet material having regions thereof which have been subjected to an elongation of about 25% or more, and said decorative sheet material comprising a substantially molecularly unoriented liquid-cast weatherable polymer film comprising an alloy of a polyvinylidene fluoride polymer and an acrylic polymer, said cast polymer film having pigments therein, and a thermoformable bonding layer adhered to the inner surface of said cast polymer film, said bonding layer comprising a thermoformable layer of acrylonitrile-butadiene-styrene polymer, and an adhesive layer between said thermoformable layer and said cast polymer film adhering said thermoformable layer to said cast polymer film, and said bonding layer also being adhered to said contoured three-dimensional outer surface of said substrate.

18. A molded automobile exterior body part having a contoured decorative outer surface, comprising a molded polymer substrate formed of polyolefin polymer having a contoured three-dimensional outer surface and a molded decorative sheet material adhered to and covering one side of said substrate and conforming to said contoured surface and imparting to said body part a high grade decorative finish having the appearance of an automotive quality painted finish, said decorative sheet material having regions thereof which have been subjected to an elongation of about 25% or more, and said decorative sheet material comprising a substantially molecularly unoriented liquid-cast weatherable polymer film comprising an alloy of a polyvinylidene fluoride polymer and an acrylic polymer, said cast polymer film having pigments therein, and a thermoformable bonding layer adhered to the inner surface of said cast polymer film, said bonding layer comprising a thermoformable layer of a polyolefin polymer, and an adhesive layer between said thermoformable layer and said cast polymer film adhering said thermoformable layer to said cast polymer film, and said bonding layer also being adhered to said contoured three-dimensional outer surface of said substrate.

19. A molded automobile exterior body part having a contoured decorative outer surface, comprising a molded polymer substrate and a molded decorative sheet material adhered to and covering one side of said substrate and conforming to said contoured surface and imparting to said body part a high grade decorative finish, said decorative sheet material comprising a substantially molecularly unoriented liquid-cast weatherable preformed self-supporting polymer film, said cast polymer film having pigments therein providing a uniform layer of color to the outer surface of said part with the appearance of an automotive quality paint finish, and a bonding layer comprising a thermoformable polymer different from said cast polymer film, said bonding layer being adhered to the inner surface of said cast polymer film and also being adhered to said contoured three-dimensional outer surface of said substrate.

20. A molded article in the form of an automobile outer body panel having a contoured decorative outer surface, comprising a molded polymer substrate selected to provide properties suited to the specific end use of the particular outer body panel, and a molded high-quality decorative sheet material with an appearance suitable for use on an automobile body panel adhered to one side of said substrate and conforming to said contoured surface to provide an outer surface which is uniformly colored in accordance with a predetermined color scheme, wherein said decorative sheet material comprises a substantially molecularly unoriented liquid-cast weatherable thermoformable polymer film which on its own is a preformed self-supporting sheet, said liquid-cast polymer film having pigments uniformly distributed therein and providing a uniform layer of color to the outer surface of said article, the polymer of the pigmented film being selected to provide a pigmented film which will maintain a paint-like appearance when stretched and elongated and which will not significantly fade, peel, chalk or crack when exposed to the environment for the intended life of the body panel, and a thermoformable bonding layer of a material which has been preselected to adhere to the particular moldable polymer from which the outer body panel is made, comprising a polymer different from the polymer of the liquid-cast film, adhering the inner surface of the liquid-cast polymer film to the molded polymer substrate.

21. A molded article according to claim 20 wherein the tear strength of the liquid-cast film is less than the bond strength of the cast film to the molded polymer substrate, whereby the film will flake off in small particles when disrupted by nicks and scratches from stones and other flying particles as routinely confront automobile surfaces.

22. A molded article according to claim 20 wherein said thermoformable bonding layer comprises a preformed film of thermoformable polymer and an adhesive layer adhering the preformed film to the inner surface of the cast polymer film.

* * * * *